Patented Apr. 10, 1934

1,954,432

UNITED STATES PATENT OFFICE 1,954,432

EPHEDRINE ETHYL MERCURI-THIOSALICYLATE

Elmer H. Stuart, Indianapolis, Ind., assignor to Eli Lilly and Company, Indianapolis, Ind., a corporation of Indiana No Drawing. Application November 4, 1933, Serial No. 696,642

4 Claims. (Cl. 260—13)

It is the object of my invention to produce a compound which has the germicidal properties of ethyl mercuri-thiosalicylic acid with which has sufficient solubility in both oil and water for practical therapeutic use; and which at the same time contributes the physiological effects of ephedrine. The new compound is ephedrine ethyl mercuri-thiosalicylate.

Ethyl mercuri-thiosalicylic acid, and the salts which it forms with the alkali metals, the alkaline-earth metals, ammonia, and certain alkyl-amines, form part of the subject-matter of Reissue Patent No. 16,921, granted April 3, 1928, and Patent No. 1,672,615, granted June 5, 1928, both in the name of Morris S. Kharasch. They are effective germicides. The alkali-metal salts are water-soluble; but they do not dissolve in vegetable and mineral oils in sufficient amount for practical antiseptic purposes. The sodium salt of ethyl mercuri-thiosalicylic acid is one of these salts, and is a powerful germicide, known to the trade as merthiolate.

Ephedrine is an alkaloid, which has certain physiological properties somewhat similar to those of epinephrin; but for certain uses has the advantage that its action is less sudden in the beginning than is that of epinephrin, but continues many times as long. It also is sufficiently water-soluble to form therapeutically effective solutions, but is difficultly soluble in oil; although it can be dissolved in oil as set forth in my Patent No. 1,743,992, granted January 14, 1930. The name ephedrine is commonly applied to l-ephedrine, which is physiologically the most active form; but there are three other stereo-isomers—d-ephedrine, l-pseudo-ephedrine, and d-pseudo-ephedrine—and certain racemic mixtures, of which dl-ephedrine is perhaps the most important. All these are included in the term ephedrine when that is used generically.

Both ethyl mercuri-thiosalicylates and ephedrine are of decided benefit in the treatment of certain respiratory affections, as of the nose, throat, and associated organs.

I have discovered that the alkaloid ephedrine, in its various stereo-isomeric forms, will combine with ethyl mercuri-thiosalicylic acid, to produce an ephedrine salt thereof—ephedrine ethyl mercuri-thiosalicylate. This salt is both water-soluble and oil-soluble in sufficient amount for effective germicidal use with the general physiological action of the ethyl mercuri-thiosalicylic acid; and in addition contributes the physiological action of ephedrine, although in the amounts in which it is used for the former action the latter action is relatively small.

The ephedrine combines with the ethyl mercuri-thiosalicylic acid in molecular proportions, one molecule to one molecule; probably by addition.

The following is a method of preparing my new ephedrine ethyl mercuri-thiosalicylate.

One pound of ethyl mercuri-thiosalicylic acid is dissolved in about one gallon of alcohol, and seven ounces of l-ephedrine alkaloid are separately dissolved in about one quart of alcohol. The alcohol may be grain alcohol or a denatured alcohol, of any concentration sufficient for solution but conveniently of about 90% to 95% concentration. Heat may be applied to facilitate solution. The two alcoholic solutions are thoroughly mixed together. The combined solution thus obtained is evaporated to dryness, desirably under vacuum at a temperature not exceeding 50è C. The solid thus obtained is l-ephedrine ethyl mercuri-thiosalicylate, is a white powder, and is sufficiently pure for direct use. If a purer product is desired, it may be obtained by recrystallization from alcohol; which yields white crystals. These crystals have a melting point of 140°–142° C., uncorrected.

Instead of using l-ephedrine, I may use the racemic dl-ephedrine. The procedure is the same, and yields a white crystalline powder. This powder is dl-ephedrine ethyl mercuri-thiosalicylate, and melts at 150°–152° C., uncorrected.

The same procedure may be used with d-ephedrine, or with either pseudo-ephedrine, or with any mixture of the isomeric ephedrines. If d-pseudo-ephedrine is used, for example, a white crystalline powder is obtained, which is d-pseudo-ephedrine ethyl mercuri-thiosalicylate. This melts at about 50° C., uncorrected.

I claim as my invention:

1. Ephedrine ethyl mercuri-thiosalicylate.
2. l-Ephedrine ethyl mercuri-thiosalicylate.
3. An oil-soluble and water-soluble compound of ephedrine with ethyl mercuri-thiosalicylic acid.
4. The process of making an oil-soluble and water-soluble compound of ephedrine with ethyl mercuri-thiosalicylic acid, which consists in forming a combined alcoholic solution of the ephedrine and said acid, and removing the solvent to obtain the compound of ephedrine and ethyl mercuri-thiosalicylic acid in solid form.

ELMER H. STUART.

CERTIFICATE OF CORRECTION.

Patent No. 1,954,432.                                                                          April 10, 1934.

ELMER H. STUART.

It is hereby certified that error appears in the printed specification of the above numbered patent requiring correction as follows: Page 1, line 3, for "with" read and; and line 76, for "50eC" read 50°C; and that the said Letters Patent should be read with these corrections therein that the same may conform to the record of the case in the Patent Office.

Signed and sealed this 15th day of May, A. D. 1934.

Bryan M. Battey (Seal)                                            Acting Commissioner of Patents.